United States Patent [19]
Taylor et al.
[11] Patent Number: 4,517,147
[45] Date of Patent: May 14, 1985

[54] PRESSING PROCESS FOR COMPOSITE WOOD PANELS

[75] Inventors: Michael N. Taylor; Timothy H. Reid, both of Tacoma, Wash.

[73] Assignee: Weyerhaeuser Company, Tacoma, Wash.

[21] Appl. No.: 599,599

[22] Filed: Apr. 13, 1984

Related U.S. Application Data

[63] Continuation-in-part of Ser. No. 576,786, Feb. 3, 1984, abandoned, which is a continuation of Ser. No. 435,140, Oct. 18, 1982, abandoned.

[51] Int. Cl.³ .............................................. B29J 5/02

[52] U.S. Cl. .................................... 264/83; 156/62.2; 156/285; 156/296; 156/312; 264/102; 264/109; 264/120

[58] Field of Search ...................... 156/62.2, 285, 286, 156/296, 307.1, 312; 264/82, 83, 102, 109, 120; 34/34, 145

[56] References Cited

U.S. PATENT DOCUMENTS 3,230,287 1/1966 Caron et al. ...................... 264/109
3,280,237 10/1966 Corbin et al. ...................... 264/109
3,891,738 6/1975 Shen .................................. 264/120
4,273,981 6/1981 Nopper .............................. 264/120
4,316,865 2/1982 Battigelli et al. .................. 264/109
4,379,101 4/1983 Smith ................................ 264/109
4,393,019 7/1983 Geimer ................................ 264/83

*Primary Examiner*—Michael Wityshyn

[57] ABSTRACT

An improved hot gas pressing system for use in manufacturing wood-based composite panels reduces in-press time substantially while reducing blistering, pitting, and warping in the final panel. Condensable steam as the preferred gas is injected into both faces of the mat after the press closes to an intermediate position compressing the mat to an intermediate density. After the steam is applied for a predetermined time period at the intermediate density quickly raising the mat temperature, a steam through step is applied after which the press is closed to its final position. Steam is reapplied to both surfaces of the densified mat to maintain temperature further reducing cure time of the adhesive after which venting and vacuum steps are applied to both surfaces of the mat to reduce internal pressure and remove moisture from the mat prior to opening of the press.

13 Claims, 4 Drawing Figures

PRESSING PROCESS FOR COMPOSITE WOOD PANELS

This application is a continuation-in-part, of application Ser. No. 06/576,786, filed 02/03/84, which was a continuation of application Ser. No. 06/435,140, filed 10/18/82 now abandoned.

BACKGROUND OF THE INVENTION

This invention relates generally to the pressing process for manufacturing composite wood-based panel products. More particularly, it relates to an improved pressing process wherein steam or other suitable condensable hot gas is injected into a wood furnish-adhesive mat during the pressing cycle.

In the manufacture of composite wood-based panel products, wood particles in various forms are combined with thermosetting or sometimes thermoplastic binder systems and formed into loosely compacted mats. The mat is then pressed to final thickness and density under pressure and elevated temperatures while the adhesive is cured. The wood particles can be in fiber form, flake form, particulate form, strand form and other forms that are known in the industry. The generic end products that result are referred to by a variety of names such as fiberboard, hardboard, flakeboard, strandboard, particleboard, and waferboard and indicate the constituent type particulate material within the product. In the case of harboard or medium density fiberboard, there is also an indication of the product density. Each product however, is characterized by being manufactured with wood particulate material and an adhesive system to bind the wood together. These panel products have a variety of well-known end uses.

In a typical manufacturing process, using fiberboard as an example, a refining station reduces the incoming wood raw material to fiber form. The fiber is then dried and directed to a blending station where the thermosetting resin is added in a controlled manner and from there to a forming station where the fiber-resin mixture is formed into loosely compacted mats. The mats can be formed individually atop cauls, although more typically the mat is continuously formed atop a moving supporting structure such as an endless belt. After the mat is formed, it must be compacted and the fiber-resin mixture pressed to thickness and final density at the pressing station. A prepressing station is normally employed to initially reduce the mat thickness and density to manageable levels prior to entry into the final pressing station. Typically, individual mats are then loaded into a platen hot press which is then closed and the resin allowed to cure. More recently single opening, quasi continuous presses have been utilized to press long mats of the wood-resin mixture. The cure time can vary depending upon resin type, final panel thickness, and density, but for a typical medium density fiberboard panel product having a thickness of 19 mm (¾"), the cure time is approximately 7–8 minutes.

The final board or panel product should have properties falling within the predetermined ranges for all panel characteristics under control. The density should be controlled as should the panel thickness. The surface should be smooth, uniform, and free from blemishes.

In typical prior art pressing systems utilizing hot platens, the resin cure time is determined, in part, by the heat transfer into the mat once the platens compress the mat. Heat must be distributed throughout the fiber-resin mixture in order to bring the entire volume of material up to the desired cure temperature. When only the conductive heat transfer vehicle is utilized, the time required to uniformaly heat the mat and cure the resin is significant.

It has been proposed in the past to use hot gases, such as steam, as a heat transfer medium to bring the unconsolidated or partially consolidated mat temperature up to the desired curing temperature quickly and to reduce consolidation pressures. For example, U.S. Pat. No. 3,280,237 assigned to the assignee of the present invention discloses the use of a superheated steam injection method to improve the pressing process in the manufacture of composite wood panel products. By utilizing superheated steam injected into the porous mat, the cure times were reduced significantly.

The process, as disclosed in U.S. Pat. No. 3,280,237, while having pressing times significantly lower than state-of-the-art press cycles, did not become commercially feasible primarily because of problems with product quality but also because of the requirement for superheated steam which is expensive to generate. It was found that an unacceptable number of panels coming out of the press were affected with blistering, surface pitting, and panel warping. It was determined the blisters were caused by incomplete steam penetration. This effect results in uncured resin and therefore structurally weak or unsound areas in the panel. Such panels are either unacceptable entirely or they must be degraded int a less valuable product going to different end uses.

Surface pitting was found to be caused by the impact of the steam flow as it was injected into the mat through holes in the platen. The mass and velocity of the steam flow was found to disturb the fiber-resin mixture in its uncured form directly under the steam injection holes. Such surface pitting is undesirable and can result in degrading a panel product into a lower grade.

Finally, the panel warping was the result of steam injection from one platen only. This resulted in the panel surfaces not having equal physical properties or uniform moisture levels after pressing. While press cycle time was reduced, the product quality was generally unacceptable and therefore the steam pressing process as disclosed in U.S. Pat. No. 3,280,237 did not become commercially viable. It has a disadvantage the requirement for superheated steam which is expensive as a heat transfer medium in a steam pressing process. Ideally, although not a requirement for practicing the present invention, saturated steam or high quality should be used as its heat of condensation can be used effectively in quickly raising the temperature of the mat and because it is less costly to generate than superheated steam.

While the potential benefits to be derived through the use of hot gases injected into a wood-resin mixture during the pressing cycle were known, a process had not been developed to successfully reduce press cycle times while producing acceptable panels of the desired grade. An improvement in the pressing system was needed to make it commercially feasible for implementation.

Accordingly, from the foregoing, one objective of the present invention is to reduce or eliminate blister, pitting and warping problems when utilizing hot gas injection to reduce press cycle times.

Another objective of the present invention is a methodology to predict the appropriate parameter values for hot gas pressing cycles for panels of various thicknesses and final densities.

These and other objectives of the present invention will become more apparent upon reading the description of the preferred embodiment in conjunction with the attached drawings.

SUMMARY OF THE INVENTION

The present invention is practiced in one form by placing a wood particulate adhesive mixture in mat form between hot gas injection press platens. The hot gas is preferably saturated steam. The mat will be pressed to a predetermined intermediate density, and then an initial period of hot gas injection will be applied to both mat surfaces at a predetermined pressure and temperature in order to quickly raise the temperature of the wood-adhesive mixture. As the hot gas is applied, the press may continue to close at a slow rate. After a time period to allow for substantially complete permeation of the mat with hot gas during which time heat transfer is taking place and while still in the intermediate density range, a gas-through step is conducted passing the hot gas through the mat from one platen surface to the other to complete permeation. The mat then will rapidly pressed to its final density sand thickness. Hot gas application is then continued to both mat surfaces at a predetermined pressure and temperature and for a time period to allow for substantially complete cure of the adhesive in the mat. A venting and vacuum step is then carried out to reduce moisture and reduce internal pressure so the press can be opened and the consolidated panel removed.

DESCRIPTION OF THE PREFERRED EMBODIMENT

Figure 1:
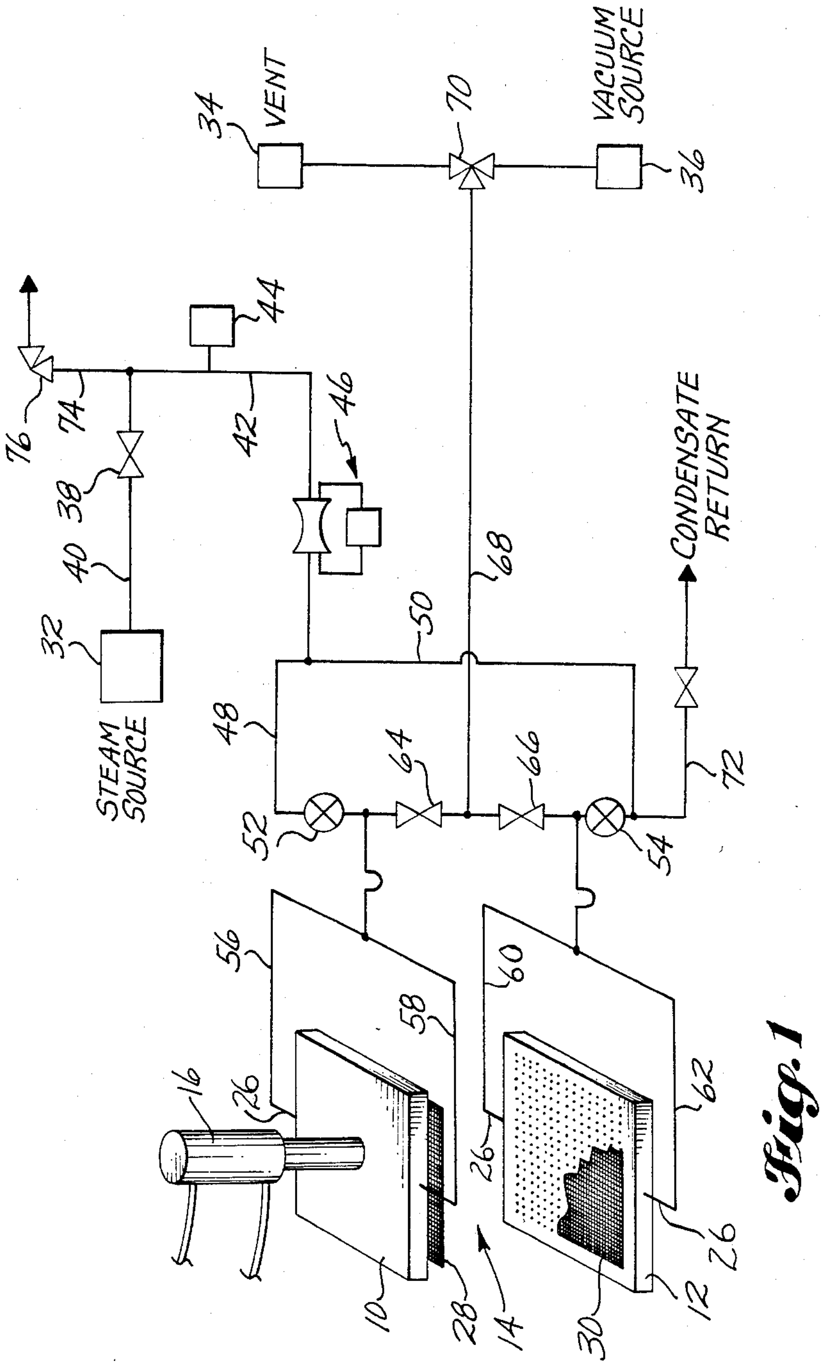
FIG. 1 is a schematic view showing the elements in the hot gas pressing system.

Referring first to FIG. 1, a schematic depiction of the pressing system shows a pair of press platen 10, 12 spaced from each other with an opening 14 therebetween. The platens are constructed and incorporated into a hot pressing system substantially according to known methods with modifications to carry out the process of the present invention. Typically, press platens are large substantially flat metal plates fixed to a supporting structure and have internal conduits for flow of a heating medium. One or both platens of an opposed pair are moveable toward and away from the other in order to open and close the press. When the press is open, the mat of wood-adhesive mixture is inerted into the press through a known loading means (not shown) and deposited atop the bottom platen. Typically, platens are opened and closed through suitable closure means using a hydraulic cylinder. In FIG. 1 a cylinder and ram assembly is indicated at 16.

At an upstream forming station (not shown), the wood-adhesive mixture is formed into a mat having the predetermined basis weight in order to provide a loosely compacted mat with the right bulk density for pressing into panels that will have a predetermined thickness and density. There are many well-known forming methods and any one is suitable for use with the present invention, provided it supplies the pressing system with uniform mats of wood-adhesive mixture having the correct predetermined weight.

Figure 2:
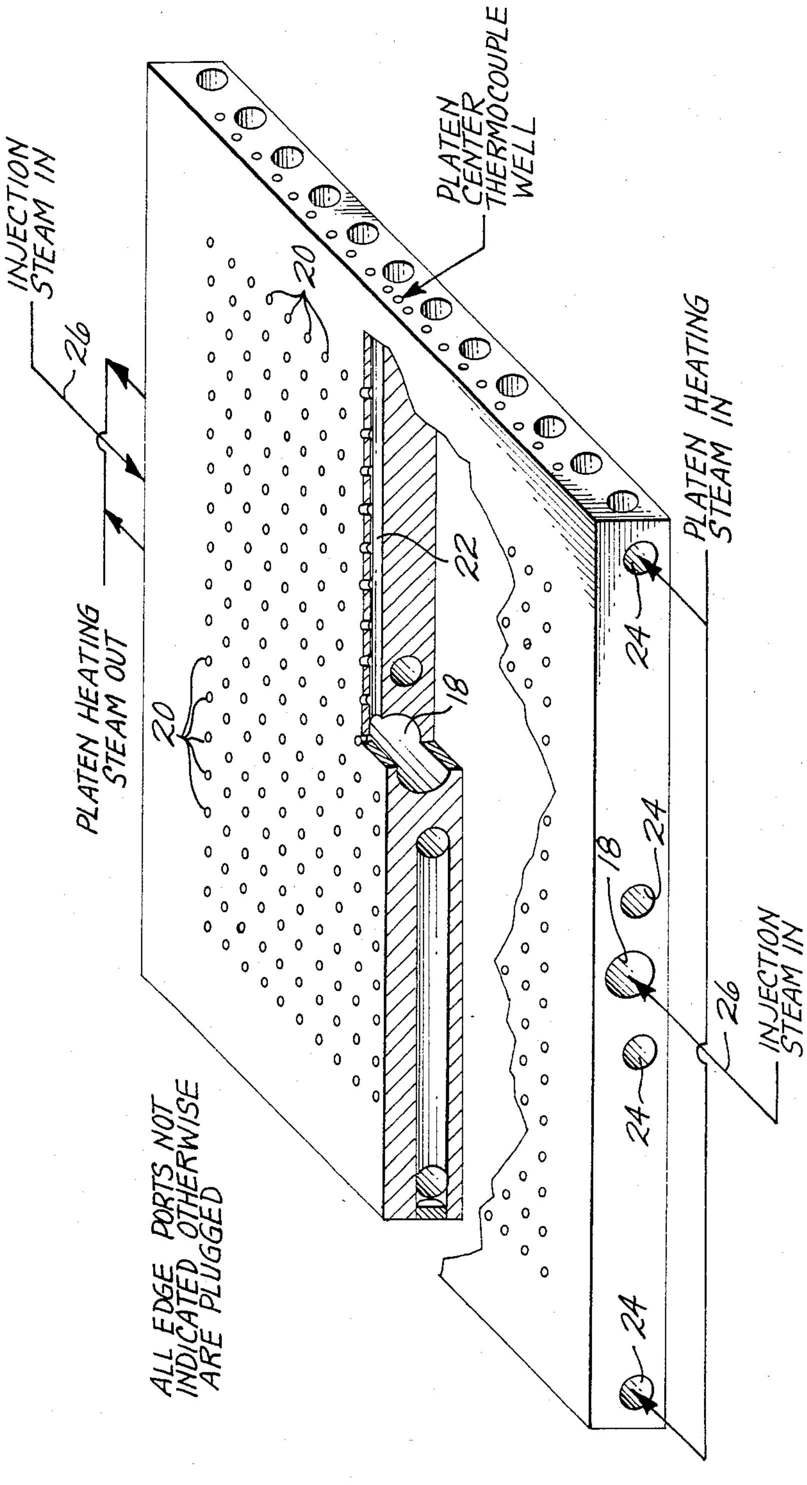
FIG. 2 is a cutaway perspective view depicting the structure of a represenative press platen usable in the pressing method.

Platens 10, 12 are modified compared to standard press platens by the addition of internal conduit 18 as shown in FIG. 2. A plurality of perforations 20 in the platen surfaces are connected to the cross boring 22. Platen heating conduits 24 are also located within each platen 10, 12 and serve to carry the platen heating medium. Conduit 18 carries the hot gas injection medium which in the preferred embodiment is high quality saturated steam from the incoming supply lines 26 and serves as a manifold to distribute the injection medium to crossboring 22. As indicated in the Figures, the injection medium is steam, although superheated steam is suitable and condensable other hot gases may be suitable. When steam is supplied to conduit 18, it will flow outwardly through perforations 20. The pattern of perforations is uniform to ensure uniform distribution of steam into the mat when, during those portions in the pressing cycle it is injected into the mat. As an example from development work conducted using a small 0.5×0.5 meter press, it has been found that for a wood fiber resin mixture 2.4 mm holes in a square pattern on 25.4 mm centers are acceptable for carrying out the process. After further development work using a large 1.22×2.44 meter press, it was found that a pattern of 23×27 mm with the perforations being offset to yield a triangular pattern produced good results. In order to properly diffuse the steam or hot gas, slow its velocity, and more evenly distribute it over the surfaces of the mat, gas velocity reducing and diffusing means such as a pair of wire screens 28,30 (a suitable commercially available screen material is KPZ 80/6 manufactured by the Peter Villsorth Company, West Germany, commonly used to transport mats into the open press) or porous metal plates are inserted between a platen and the mat. The incoming supply lines 26 of each platen are connected to a powered valving system as depicted in FIG. 1 that allows the incoming steam supply lines 26 to be in one of four states: closed, connected to the steam source 32, open to atmosphere 34, or open to a vacuum source 36. The valving system, the press closure means, and the steam system pressure can be controlled and programmed through a small computer or with the use of several microprocessors. The press closure means is functional to move the platens 10, 12 in a controlled manner from the open position to the fully closed position with the ability to hold positions and vary closure rates in order to carry out the steps of the present invention. The closed position is that position when the mat has been compressed to its final predetermined in-press thickness.

The valving system serves to control the application of steam, its pressure at the mat surfaces, and time duration. The valving system also controls the venting and application of the vacuum to the surfaces of the mat. A steam supply control valve 38 allows steam at a suitable predetermined temperature and pressure to enter the pressing system from source 32 through line 40. A suitable measurement device in line 42, indicated schematically at 44, serves to detect the pressure and temperature in order to properly control the steam source 32. Flow measurement means 46 detects the flow rate of the steam in line 42. At the T-joint in line 42, a steam line 48 is directed to the top platen 10 and a steam line 50 is directed to the bottom platen 12. Steam valves 52, 54 serve to open and close lines 48, 50 respectively as steam is called for by the process control system controlling the pressing process. Line 48 is then divided at another T-joint and lines 56, 58 are directed to opposite sides of upper platen 10. The top platen steam inlet temperature and pressure are measured by any suitable means (not shown) and signals directed to the process control system. The platen temperature is also measured and controlled since it is consistently maintained a few degrees hotter than the maximum injection steam temperature to prevent steam condensation in the platen. All steam lines between steam valve 38 and press platens 10, 12 are also heat traced and insulated to prevent steam condensation within the lines. It is the purpose to have the condensable hot gas give up its heat of condensation to the wood fiber-resin mixture thereby quickly raising its temperature to the desired curing temperature of the adhesive.

Steam line 50 is likewise divided into separate flow lines 60, 62 which are directed to opposite sides of bottom platen 12. Similarly, as with upper platen 10, the inlet steam temperature, pressure and platen temperature are detected for monitoring control purposes and suitable signals sent to the process control system. Exhaust valves 64, 66 are controllable, and when open, connect the platens to exhaust line 68 which is directed to a three-way valve 70 which is either open to vacuum source 36 or to atmosphere 34.

Line 72 serves to divert compensate developed in the steam lines ahead of valves 52, 54. Branching from line 42 after supply valve 38, is line 74 which leads to a pressure safety valve 76.

Having structurally described a pressing system capable of carrying out the process steps of the present invention, definitions of a general set of process parameters will now be given to be followed by an exemplary set of parameter values for pressing a particular panel. By being specific to a particular wood composite panel manufacturing process, it is not intended that the scope of the invention be limited, but rather that those skilled in the art understand a particular embodiment of the invention.

Figure 3:
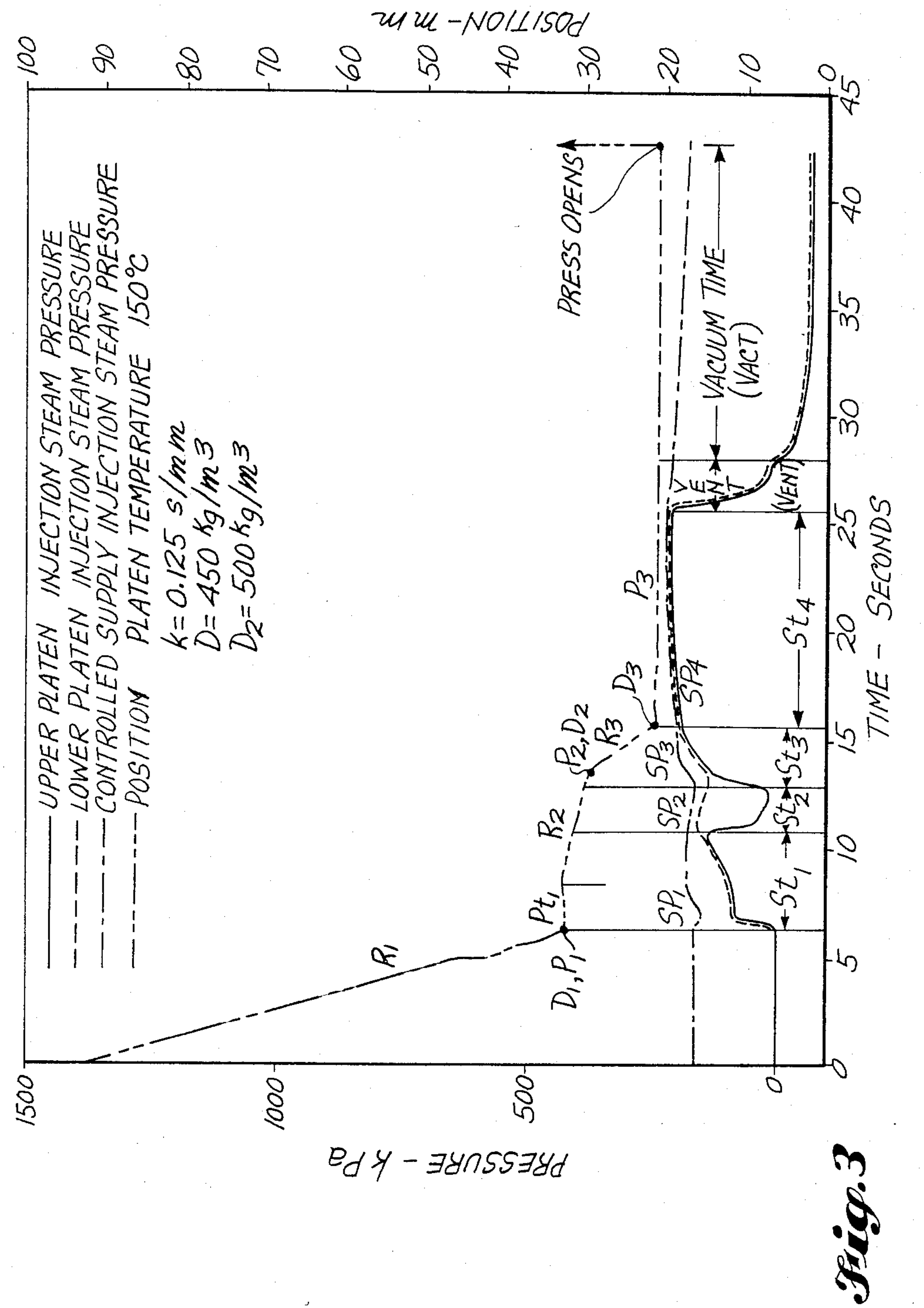
FIG. 3 is a graph visually depicting exemplary press cycle variables as they change over the steps of the present invention.
Figure 4:
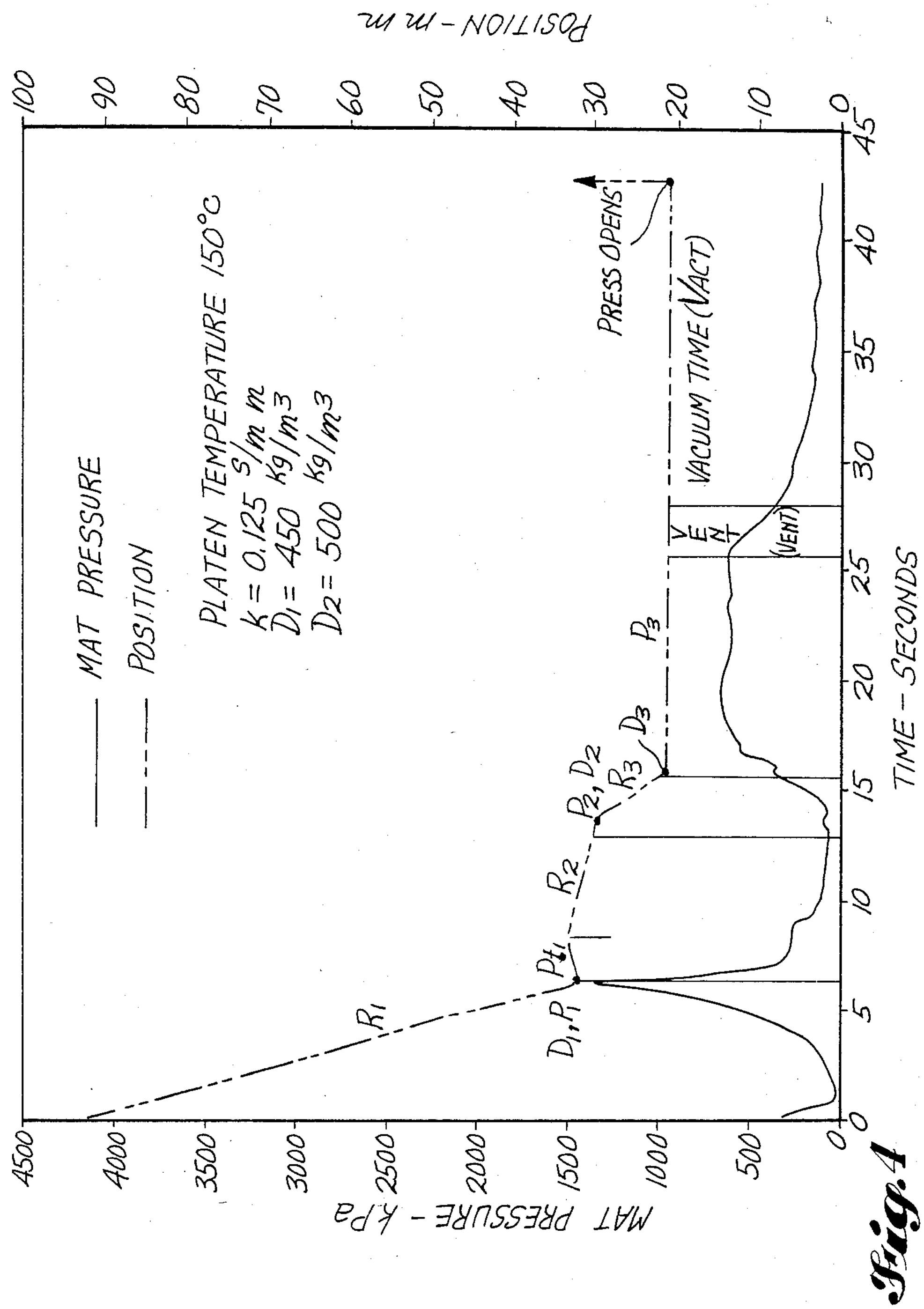
FIG. 4 is another graph depicting the mat pressure response as it changes over a representative press cycle.

The process parameters are divided into two groups: "pressing" parameters that control press actions of closing and holding position; and "steaming" parameters that control the injection valving, steam, and vacuum. FIGS. 3 and 4 show the curves for the exemplary press cycle and provide a visual reference for the parameters. The table following the parameter definitions is of the process parameters as they appear for computer programming. The pressing parameters are:

$P_n$—Press position or mat thickness, three positions are used in the press cycle design: $P_1, P_2, P_3$. Units=mm.

$Pt_n$—Time at press position n; only one position time, $Pt_1$, is used and is used to improve transistion from $R_1$ to $R_2$. Units=s.

$R_n$—Press closing rate to press position n, three rates: $R_1$, $R_2$, $R_3$ are used. Units=mm/s.

$D_n$—Mat density at press position n; $D_1$, $D_2$, $D_3$ are used in calculation of the position parameters. Units=kg/m$^3$.

k—A proportionality parameter used in calculation of $St_1$. Units=s/mm.

The steaming parameters are:

$P_1$—Press position 1 as defined in the pressing parameters is used again in the steam control to initiate the sequence of events.

$St_n$—Time duration of steaming event n, four steam times are used: $St_1$, $St_2$, $St_3$, $St_4$. Units=s.

$SP_n$—Steam pressure used during steaming event n, four steam pressures are used: $SP_1$, $SP_2$, $SP_3$, $SP_4$. Units=kPa.

Vent—Time duration of opening the platens to atmosphere after the steaming sequence and prior to opening the platens to the vacuum source.

Vact—Time duration of opening the platens to vacuum.

The definitions for the valving codes in the Table below are as follows:

20=Both platens closed to steam, atmosphere and vacuum.

11=Both platens open to steam.

13=Top platen open to steam, bottom platen open to atmosphere.

18=Both platens open to atmosphere.

19=Both platens open to vacuum.

PRESS CYCLE TABLE

Pressing Sequence

| Step | Rate or Position | | Switch Point |
|---|---|---|---|
| 1 | $R_1$ | UNTIL | $P_1$ |
| 2 | $P_1$ | UNTIL | $Pt_1$ |
| 3 | $R_2$ | UNTIL | $P_2$ |
| 4 | $R_3$ | UNTIL | $P_3$ |
| 5 | $P_3$ | UNTIL | Press Opens |

Steaming Sequence

| Step | Valving Code | | Switch Point | Pressure |
|---|---|---|---|---|
| 1 | 20 | UNTIL | $P_1$ | $SP_1$ |
| 2 | 11 | UNTIL | $St_1$ | $SP_1$ |
| 3 | 13 | UNTIL | $St_2$ | $SP_2$ |
| 4 | 11 | UNTIL | $St_3$ | $SP_3$ |
| 5 | 11 | UNTIL | $St_4$ | $SP_4$ |
| 6 | 18 | UNTIL | Vent | Atmospheric |
| 7 | 19 | UNTIL | Vact | −90 |
| 8 | Press Opens | | | |

The following process example is for producing a medium density fiberboard with the furnish being red alder wood fibers produced in a typical pressurized refiner and having a moisture content of 11% dry basis prior to pressing. The adhesive used is a commercially available urea formaldehyde resin and is added to the fiber using conventional blending at a rate of 9% resin solids on a dry wood weight basis. Additionally, 0.25% paraffin wax solids are added to the fiber. At the forming station, the proper amount of fiber-resin mixture is deposited in mat form on the bottom screen to yield a predetermined panel thickness (21.1 mm) and density (700 kg/m$^3$) after pressing. The top screen is placed on the mat after forming.

Following are specific parameter values for pressing the above-described medium fiberboard. FIGS. 3 and 4 depict press position, steam pressures, and mat pressure as they occur during the total pressing period of 43 seconds.

Following the table of press cycle parameters, physical properties of the finished panel are given. Also listed are the properties for the same panel formulation in a conventionally heated press for 475 seconds using a platen temperature of 171° C.

| Press Cycle Table for Medium Density Fiberboard Example | | | | |
|---|---|---|---|---|
| Pressure Sequence | | | | |
| Step | Rate or Position | | Switch Point | |
| 1 | 10 mm/s | UNTIL | 32.8 mm | |
| 2 | 32.8 mm | UNTIL | 2.0 s | |
| 3 | 0.8 mm/s | UNTIL | 29.5 mm | |
| 4 | 4.2 mm/s | UNTIL | 21.1 mm | |
| 5 | 21.1 mm | UNTIL | PRESS OPENS | |
| Steaming Sequence | | | | |
| Step | Valving Code | | Switch Point | Pressure |
| 1 | 20 | UNTIL | 32.8 mm | 150 kPa |
| 2 | 11 | UNTIL | 4.1 s | 150 kPa |
| 3 | 13 | UNTIL | 2.0 s | 150 kPa |
| 4 | 11 | UNTIL | 3.0 s | 200 kPa |
| 5 | 11 | UNTIL | 10.0 s | 200 kpa |
| 6 | 18 | UNTIL | 2.0 s | 0 kPa |
| 7 | 19 | UNTIL | 15.0 s | −90 kPa |
| 8 | (PRESS OPENS) | | | |
| Base Parameters: | | | | |
| $D_1 = 450\ kg/m^3$ | | $D_2 = 500\ kg/m^3$ | | $k = 0.125$ s/mm |

| Panel Properties | | | | | | |
|---|---|---|---|---|---|---|
| | | | | | 24-Hour Water Soaking | |
| Sanded Thickness (mm) | Density ($kg/m^3$) | Internal Bond Strength (kPa) | Modulus of Rupture (MPa) | Modulus of Elasticity (GPa) | Water Absorption (%) | Thickness Swelling (%) |
| Steam Pressed | | | | | | |
| 18.7 | 712 | 1,180 | 22.8 | 2.36 | 48 | 8.2 |
| Conventionally Pressed | | | | | | |
| 19.3 | 705 | 783 | 32.9 | 3.13 | 56 | 9.7 |

Having described the general process parameters and given specific values for a particular exemplary panel, the following describes the functions of process steps and the method for determining parameter values for other mat basis weights and wood particulate geometries.

Conceptually, four process requirements were needed in order to eliminate blisters, surface pitting and panel warping. First, the mat should have the steam or other selected hot gas completely penetrate the volume of mat material in order to effect complete heat transfer raising the mat temperature quickly and uniformly throughout. Second, the platen pressure on the mat surfaces should be relatively low during the portion of the cycle when steam penetration occurs such that the surface consolidation does not prevent flow to the core. Third, steam velocity at the injection locations should be relatively low thereby eliminating disturbances of the wood-resin mixture over the surface, and fourth, steam treatment of the surfaces should be substantially equal.

Starting with the need for low steam velocity to reduce pitting, two methods are used. First, the wire screens 28, 30 are used on both sides of the mat to create channels for lateral steam flow at the platen surface. This allows the steam to spread to a uniform front over the entire mat surface, rather than being concentrated at points directly under the platen perforations 20. Second, the total steam flow rate is controlled by initially steaming at low steam pressures and with a preselected intermediate mat density ($D_1$) that also serves to control steam flow.

To meet the requirement of low platen pressure during steam penetration, the press closing rate is reduced after reaching the intermediate mat density ($D_1$) to a slow rate ($R_2$) until steam penetration is substantially complete and the entire mat substantially saturated with steam. The selection of the intermediate mat density is again important as a density too high result in excessive platen pressure.

The function of second closing rate ($R_2$) is to maintain contact between the mat surface, screen and top platen. The mat may shrink in thickness slightly during the first two steam periods ($St_1$ and $St_2$). Sufficient mat contact minimizes steam loss at the mat edges and maintains steam flow into the mat core. No edge sealing apparatus around the platen perimeter is required in this process. However, the pressing screen edges are filled with silicone rubber to prevent steam leakage through the screen edges. This filled band at the screen edge is covered by several centimeters of the particle mat.

The result of the low steam velocity and low platen pressure requirements is that there must be an intermediate density or range that satisfies both these potentially exclusive conditions; that is, a density high enough to slow steam flow and avoid surface pitting, yet low enough to avoid platen pressure levels that cause blisters. Experiments have shown that an acceptable range of densities exists for wood particles, generally between 300 $kg/m^3$ and 550 $kg/m^3$. The optimum values vary with wood species and particle geometry, and generally must be determined by experimentation.

The third requirement is to ensure complete steam penetration of the mat core. Because steam injection is initiated from both platens, areas of localized high mat weight or pockets of air within the mat may restrict steam flow. To assure complete penetration after initially steaming for a time ($St_1$) from both platens, the steam valve on one platen is closed and switched to venting mode while steam is applied through the other platen. This allows steam flow through the mat for a time ($St_2$) from one surface to the other and produces complete steam saturation of the mat core. This is done after the surfaces have received steam, so no dissimilar consolidation or treatment of the mat surfaces will occur. A short (approximately 2–20 second) push from one side was found to eliminate any unsteamed pockets. This time period appears to be adequate for any mat weight. On completion of the second steam period, the press is closed to final thickness ($P_3$) at rate $R_3$. The temperature of the mat during $St_1$ and $St_2$ is quickly elevated and established at a point corresponding to the saturation temperature of the condensable gas. The rate $R_3$ is not critical to the process but should be relatively rapid to minimize press cycle time. As depicted in FIGS. 3 and 4, the position vs. time curve has a step shaped.

After reaching the final thickness ($P_3$) and density ($D_3$) in the cycle, the purpose changes from avoiding the steam pressing problems to meeting the temperature requirements of adhesive cure and pressure and moisture requirements for press opening. The balance of the in-press time generally depends upon panel thickness, particle type and adhesive. As may be seen in FIG. 3 for the fiber furnish where urea formaldehyde is the adhesive, steam pressure will be maintained on both faces of the mat after the final position is reached. During final press closing, the steam pressure is brought up to the final curing temperature and pressure for a period ($St_4$) as seen on the curves. In the example, approximately ten seconds of steam application is needed to establish the temperature to cure the resin, after which the press is first vented (Vent) for approximately 2 seconds and then a vacuum drawn (Vact) to evacuate the gases and moisture from the pressed panel. After a suitable time, approximately 15 seconds in the example, and preferably after releasing the vacuum the press is opened and the board removed from the press, completing the pressing operation.

The fourth requirement of equal surface treatment is essentially met by initially injecting the gas or steam through both surfaces until the mat is substantially saturated. After the initial steam saturation step ($St_1$), the short steam-through step ($St_2$) can be carried out without affecting the surface. Additionally, the steam-through step is done before final panel consolidation ($R_3$) and the final steaming step ($St_4$) where steam is again applied to both surfaces.

The press cycle parameters associated with the first two steaming periods can be calculated for other mat basis weights based on two relationships. One, total steam requirements are proportional to the mat mass or basis weight; and two, steam flow rate into the mat is a function of furnish geometry, mat density and steam pressure, and is independent of time or mat thickness.

From known thermodynamic equations, the theoretical steam mass flow requirement to bring a mat to saturated steam temperatures can be calculated given the mat mass, mat heat capacity, and heat of condensation of the steam. This assumes the mat temperature change is the result of steam condensation only. The second relationship was suggested by experimental steam flow vs. time data that shows steam flow to reach steady state almost within the first second after initiation. The steam flow slows when mat saturation occurs. Given this steam flow rate, the required initial steam time to heat the mat to steam saturation temperature is proportional to the mass of the mat or basis weight.

The steam flow rate during the first remaining period also varies with the initial mat steaming densities ($D_1$ and $D_2$) and steam pressure ($SP_1$), and furnish geometry. Once the steaming densities ($D_1$and $D_2$) and steam pressure ($SP_1$) are selected for a particular furnish within the limits establish by the surface pitting and blister problems, the initial steam time ($St_1$) varies only with mat basis weight. This is mathematically equivalent to: $St_1 = k \times P_1$ as the initial steaming position ($P_1$) varies proportionally to mat basis weight. The proportionality parameter (k) may be determined from calculated steam requirements and steam flow rate data. The proportionality parameter (k) must yield an initial steam period ($St_1$) of sufficient length to substantially saturate the mat with steam. The position parameters, $P_1$ and $P_2$, are calculated by generally known formulas to yield densities, $D_1$ and $D_2$, for the mat basis weight to be pressed.

In the medium density fiberboard example, the $P_1$ position is maintained for a period ($Pt_1$) of two seconds. This allows the press control means to accurately achieve the first position ($P_1$) before beginning the second press cclosing rate ($R_2$).

The second press closing rate ($R_2$) continues through the second steaming period ($St_2$). As in the example for fiberboard, the second steaming period ($St_2$) is about two seconds. The second rate may therefore be calculated:

$$R_2 = \frac{P_1 - P_2}{St_1 + St_2 - Pt_1}$$

The third press closing rate is not critical to the process, but should be rapid to minimize pressing time. Steaming is continued from both platens during this period ($St_3$) and may be used as a transition period to the final steaming conditions necessary to reach and maintain uniform temperature for adhesive cure.

The press cycle parameters that follow the first three steaming periods ($St_1$, $St_2$ and $St_3$) have the functions of affecting adhesive cure and degassing and drying the panel for press opening. The curing steam period ($St_4$) must be determined experimentally for a given adhesive according to desired physical properties. For example, phenol formaldehyde adhesives generally require a longer period ($St_4$) and higher steam pressures ($SP_4$) than urea formaldehyde adhesives. The vent period serves to relieve the panel of steam or other gases under high pressure. The vacuum period removes steam or other gases not expelled by their pressure and dries the board. The degassing periods (Vent and Vact) generally must be varied with final panel thickness ($P_3$), density ($D_3$), and furnish geometry.

In addition to use of alternate types of adhesive, it has been previously pointed out that wood furnishes other than fiber can be utilized and the broad pressing process may still be employed as the pressing cycle although the parameter values may vary dependent upon adhesive, furnish, and final density and thickness desired. One having ordinary skill in pressing technology for composite panels will readily understand how each particular press cycle will be derived for the variables. When using saturated steam as the hot condensable gas and when manufacturing conventional wood based panels using conventional adhesives, as a general statement of the approximate allocation of time to the various steps in the pressing process it may be stated that: (1) the period from beginning of press closure to reaching $D_1$ should be about 15% or less of the time to press opening, (2) the period for $St_1$ should be from about 3-15% of the total time, (3) the period for $St_2$ should be from about 5-25% of the total time, (4) the period for $St_3$ and $St_4$ combined should be from about 10-60% of the total time, and (5) the period for Vent and Vact combined should be from about 5-45% of the total time and the Vact step will be about five times the length of the Vent step.

While a detailed description has been given to the improved hot gas pressing process, one that will enable those skilled in the art to both make and use the invention, it may occur to others that modifications may be made without departing from the broad scope of the invention. All such modifications are intended to be included within the scope of the following claims.

We claim:

1. A method of forming a panel or the like from a mat of lignocellulosic material and a curable binder, comprising the steps of:

compressing the mat between a pair of heated press platens to a first density within an intermediate-density range which is less than a final density and to a thickness within an intermediate thickness range which is greater than the final thickness, injecting steam into both major surfaces of the mat while the mat is within the intermediate density and thickness ranges for a period of time sufficient to substantially saturate the mat with steam while allowing excess steam to exhaust through the edges of the partially compressed mat, passing steam substantially through the mat from one major surface to the other while the mat is still within the intermediate density and thickness ranges to assure complete saturation, compressing the mat to a higher density and a lower thickness to consolidate the mat and cure the binder, and opening the platens after curing the binder and removing the so formed panel.

2. The method as in claim 1 including the step of finally curing the binder after the mat is compressed to its final density and thickness by again injecting steam into both major surfaces of the mat before opening the platens.

3. The method as in claim 2 including the step of venting the mat after the mat has reached its final density and thickness and after the binder has been substantially cured.

4. The method as in claim 3 including the further step of drawing a vacuum over both major mat surfaces after the venting step.

5. The method as in claim 1 including the step of continuing to compress the mat when it is within the intermediate density and thickness ranges and while the steam is being injected into the mat.

6. The method as in claim 1 in which the steam is saturated steam.

7. The method as in claim 1 in which the steam is superheated steam.

8. The method as in claim 1 in which the time for compressing the mat to the first density is about 15% or less of the period from beginning of platen closure to platen opening.

9. The method as in claim 8 in which the time for injecting the steam into both major surfaces is from about 3–15% of the period from beginning of platen closure to platen opening.

10. The method as in claim 9 in which the time for passing steam through the mat is from about 5–25% of the period from beginning of platen closure to platen opening.

11. The method as in claim 2 in which the time for further injecting steam into both surfaces of the mat is from about 10–60% of the period from beginning of platen closure to platen opening.

12. The method as in claim 4 in which the venting and vacuum steps combined are from about 5–45% of the period from beginning of platen closure to platen opening.

13. The method as in claim 12 in which the vacuum step is about five times the length of time of the venting stem.

* * * * *

UNITED STATES PATENT AND TRADEMARK OFFICE
CERTIFICATE OF CORRECTION

PATENT NO. : 4,517,147

DATED : May 14, 1985

INVENTOR(S) : Michael N. Taylor; Timothy H Reid

It is certified that error appears in the above—identified patent and that said Letters Patent is hereby corrected as shown below:

In column 2, line 31, "int" should read --into--;

in column 2, line 50, "steam or" should read --steam of--;

in column 3, line 60, "inerted" should read --inserted--;

in column 4, line 20, "condensable other" should read --other condensable--;

in column 6, line 60, "medium fiberboard" should read --medium density fiberboard--;

in column 6, line 66, "formulation in" should read --formulatior pressed in--;

in column 7, line 30, "kg/" should read --(kg/--;

in column 8, line 30, "experimentation." should read, --experimentation. It has been found that density variation of ± 15% can readily be accommodated by the process.--;

UNITED STATES PATENT AND TRADEMARK OFFICE
CERTIFICATE OF CORRECTION

PATENT NO. : 4,517,147

DATED : May 14, 1985

INVENTOR(S) : Michael N. Taylor; Timothy H. Reid

It is certified that error appears in the above—identified patent and that said Letters Patent is hereby corrected as shown below:

in column 9, line 40, "remaining" should read --steaming--;

in column 9, line 63, "cclosing" should read --closing--;

Signed and Sealed this

*Twenty-fourth* Day of *September 1985*

[SEAL]

*Attest:*

DONALD J. QUIGG

*Attesting Officer*

*Commissioner of Patents and Trademarks—Designate*